United States Patent

Nesson

[11] 3,762,289
[45] Oct. 2, 1973

[54] CAMERA SHUTTER ASSEMBLY
[75] Inventor: Israel Nesson, Fair Lawn, N.J.
[73] Assignee: Berkey Photo, Inc., Paramus, N.J.
[22] Filed: Oct. 11, 1972
[21] Appl. No.: 296,678

[52] U.S. Cl. ............... 95/10 CT, 95/53 EB, 95/60
[51] Int. Cl. ........ G03b 7/08, G03b 9/16, G03b 9/26
[58] Field of Search ............ 95/10 C, 10 CT, 53 R, 95/53 EB, 60, 59

[56] References Cited
UNITED STATES PATENTS

| | | | |
|---|---|---|---|
| 3,522,765 | 8/1970 | Johnson | 95/53 EB X |
| 3,545,352 | 12/1970 | Bellows | 95/10 CT |
| 3,416,425 | 12/1968 | Rigolini | 95/60 X |
| 3,459,112 | 8/1969 | Stamp et al. | 95/60 |
| 2,800,844 | 7/1957 | Durst et al. | 95/60 |

*Primary Examiner*—Joseph F. Peters, Jr.
*Attorney*—Sidney Neuman et al.

[57] ABSTRACT

A camera shutter assembly is provided which is of electromechanical construction and permits accurate automatic shutter speed control. The assembly embodies first and second shutter members which are adjustably mounted on a panel provided with an opening, the latter being aligned with the lens of the camera. The first shutter member has an aperture formed therein which is adapted to be aligned with the panel opening when the first shutter member is in a first position of adjustment. When in a second position of adjustment, the first shutter member closes off the panel opening. Subsequent to the first shutter member assuming it first position of adjustment, the second shutter member is movable independently of said first shutter member to an aperture-closing first position. The second shutter member is moved by the first shutter member to a second position of adjustment wherein the second shutter member is out of registration with the panel opening. A cocking lever and trigger mechanism are provided which operate in a predetermined sequence with respect to one another and in conjunction with a plurality of latch means whereby the time sequence of relative movement of the first and second shutter members to their first positions of adjustment is automatically controlled in relation to the light intensity surrounding the object being photographed.

7 Claims, 10 Drawing Figures

PATENTED OCT 2 1973  3,762,289

CAMERA SHUTTER ASSEMBLY

BACKGROUND OF THE INVENTION

Various camera shutter assemblies have heretofore been utilized; however, because of certain structural characteristics, they have been beset with one or more of the following shortcomings: (a) the assembly was of complex and costly construction; (b) it was delicate or fragile and required an inordinate amount of adjustment and repair; (c) it was difficult and awkward to repair or service; (d) it was incapable of automatically adjusting the shutter speed to compensate for variations in light intensity surrounding the object to be photographed; (e) it was difficult to assemble and oftentimes necessitated enlarging the camera housing in order to accommodate same; and (f) it was awkward to manually manipulate and required the talents of one knowledgeable in photographic techniques and procedures to properly operate and set various components of the shutter assembly before taking the picture.

SUMMARY OF THE INVENTION

Thus, it is an object of the invention to provide a shutter assembly which is not beset with the aforenoted shortcomings associated with prior structures.

It is a further object of the invention to provide a shutter assembly which utilizes simple inexpensive mechanical components which are easy to assemble and may be readily repaired or serviced when required.

It is a further object of the invention to provide a shutter assembly wherein the cocking lever thereof is manually moved to its cocked position, while the other components remain in a static condition.

It is a still further object of the invention to provide a shutter assembly wherein the cocking lever thereof, when manually moved to a cocked position, increases the biasing effect of the biasing springs associated with the shutter members, the latter comprising further components of the assembly.

Further and additional objects will appear from the description, accompanying drawings and appended claims.

In accordance with one embodiment of the invention, a camera shutter assembly is provided which includes a mounting panel disposed within the camera housing and having an opening formed therein which is aligned with the focal axis of the lens mounted on the front end of the housing. Adjustably mounted on the panel are first and second shutter members. The first shutter member is provided with an aperture which is aligned with the panel opening when the first shutter member is disposed in a first position of adjustment. The first shutter member is adapted to assume a second position of adjustment whereby the aperture is out of registration with the panel opening and the latter is closed thereby. The second shutter member is adapted to assume a first position of adjustment independently of said first shutter member after a finite time interval following the first shutter member having assumed its first position of adjustment. The second shutter member, when in its first position of adjustment, abruptly closes off the aperture of the first shutter member. The second shutter member is moved to a second position of adjustment by the first shutter member only when the latter is moving to its second position of adjustment. The second shutter member, when in its second position of adjustment, is out of registration with the panel opening and a portion of the first shutter member closes off the panel opening. Both of said shutter members are biased to assume their first positions of adjustment. A cocking lever is also provided and is adjustably mounted on the mounting panel and is biased to assume a rest position, when said shutter members are in their second positions of adjustment. The biasing effect on the cocking lever is greater than the combined biasing effect on the two shutter members. The cocking lever is manually movable from its rest position to a cocked position. During such manual movement of the cocking lever, the shutter members remain in a static condition while the biasing effect on each of the shutter members is increased. A first latch means is adjustably mounted on the panel and is adapted to automatically retain the cocking lever in its cocked position. A second latch menas is adjustably mounted on the panel and is adapted to automatically retain the first shutter member in its second position of adjustment while the cocking lever is manually moved to and remains in its cocked position. A third latch means is adjustably mounted on the panel and is adapted to retain the second shutter member in its second position of adjustment while said cocking lever is moved to and remains in its cocked position. A manually actuated adjustably mounted trigger mechanism is provided which is adapted to release said second latch means from its shutter member-holding position. Upon said second latch means assuming its release position and provided the cocking lever is in its cocked position, the first shutter member will automatically move to its first position of adjustment. A time delay means is operatively connected to the third latch means and actuates the latter to a second shutter member-release position whereby the latter automatically moves to its first position provided said cocking lever is in its cocked position and a finite time interval has elapsed subsequent to the first shutter member having assumed its first position of adjustment. The duration of the finite time interval is dependent upon the ambient light characteristics of the object being photographed.

DESCRIPTION

For a more complete understanding of the invention, reference should be made to the drawings wherein.

Figure 1:
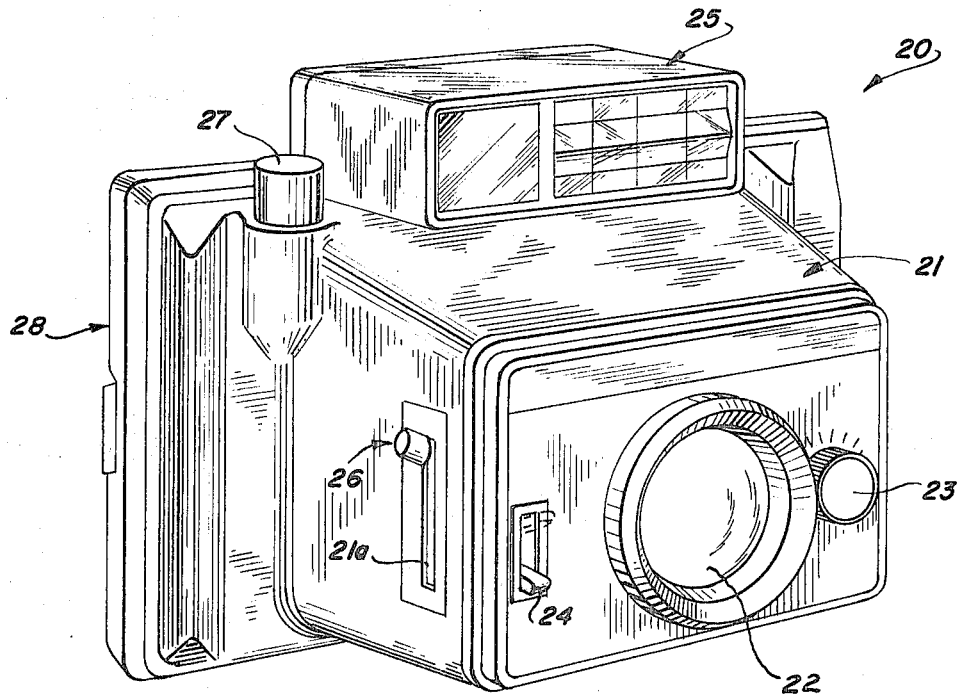
FIG. 1 is a perspective front view of a camera embodying the improved shutter assembly.

Referring now to the drawings and more particularly to FIG. 1, a camera 20 is shown which includes an opaque housing 21 having a focusing lens 22 adjustably mounted on the front end thereof. Disposed to one side of the lens 22 and mounted on the housing front end is a light measuring or auxiliary opening 23. Also mounted on the housing front end and on the opposite side of the focusing lens 22 is a manually adjustable strobe light or flash switch 24. Fixedly mounted on the top of the housing and recessed from the front end thereof is a strobe light and viewfinder assembly 25. Positioned on the side of the housing 21 and near the front end thereof is a manually actuated cocking lever 26. Disposed rearwardly of the cocking lever and mounted on the upper portion of the housing is a manually depressible trigger button 27. A cover 28 is hingedly connected to the rear of the housing to permit loading and unloading of the camera.

The improved shutter assembly 30 to be hereinafter described is disposed within the housing and is concealed from view when the cover 28 is in its closed position. The shutter assembly is positioned rearwardly of the focusing lens 22 and adjacent to, but ahead of a film cartridge holder, not shown. The holder is adjacent the cover 28 and is exposed for loading and unloading a film cartridge when the cover is in an open position.

Figure 8:
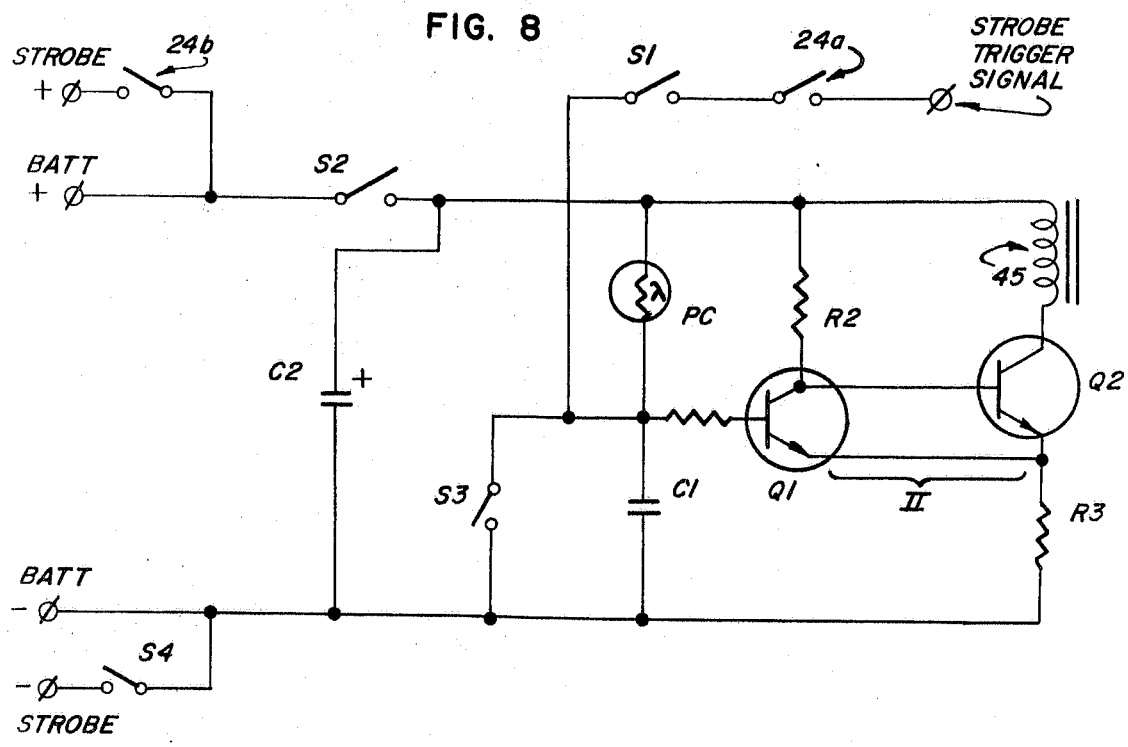
FIG. 8 is a diagram of the time delay control circuit.
Figure 9:
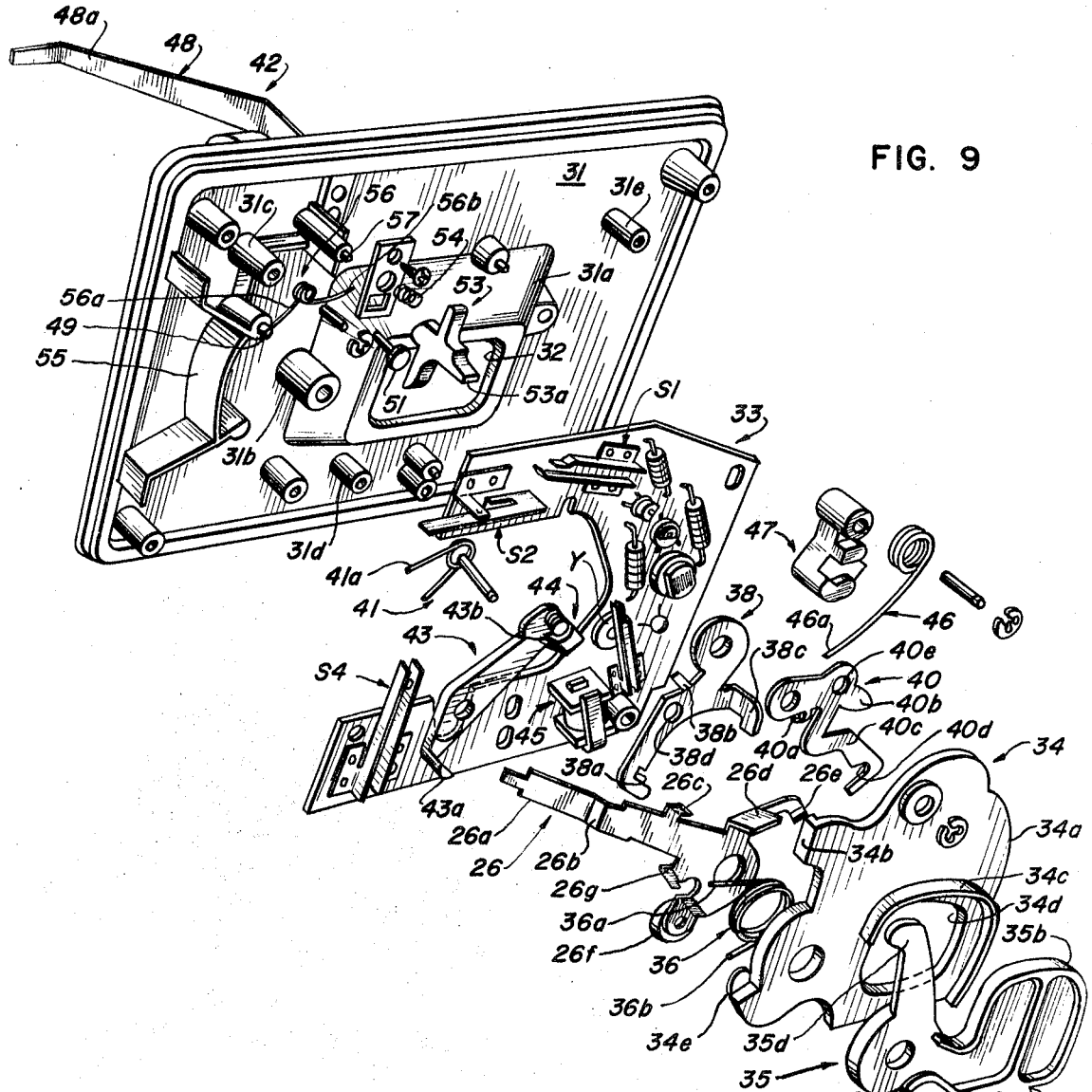
FIG. 9 is an enlarged, perspective, exploded view of the components comprising the shutter assembly shown in FIG. 2.

The assembly 30, as seen more clearly in FIG. 9, includes a mounting panel 31 which is fixedly secured to the interior of the housing 21. The panel 31 is provided with an opening 32 of fixed dimension which is aligned with the focal axis of the lens 22. The portion 31a of the panel circumjacent the opening is offset forwardly. Secured to the front face of panel 31 is a substantially C-shaped electrical circuit board 33 on which are mounted a plurality of electrical components comprising the time delay circuit shown in FIG. 8. The time delay circuit and its components will be described more fully hereinafter.

Mounted for pivotal movement about a post 31b formed on the front face of panel 31 are a pair of opaque shutter members or blades 34 and 35. Member 34 is hereafter sometimes referred to as the first shutter member and member 35 is sometimes referred to as the second shutter member. Each shutter member is provided with a coiled biasing spring 36 and 37. If desired, the shutter members may be slideably mounted on the panel rather than pivotally mounted, as shown.

Pivotally mounted on a second post 31c formed on the front face of panel 31 are first and second latch members 38 and 40, respectively.

Figure 2:
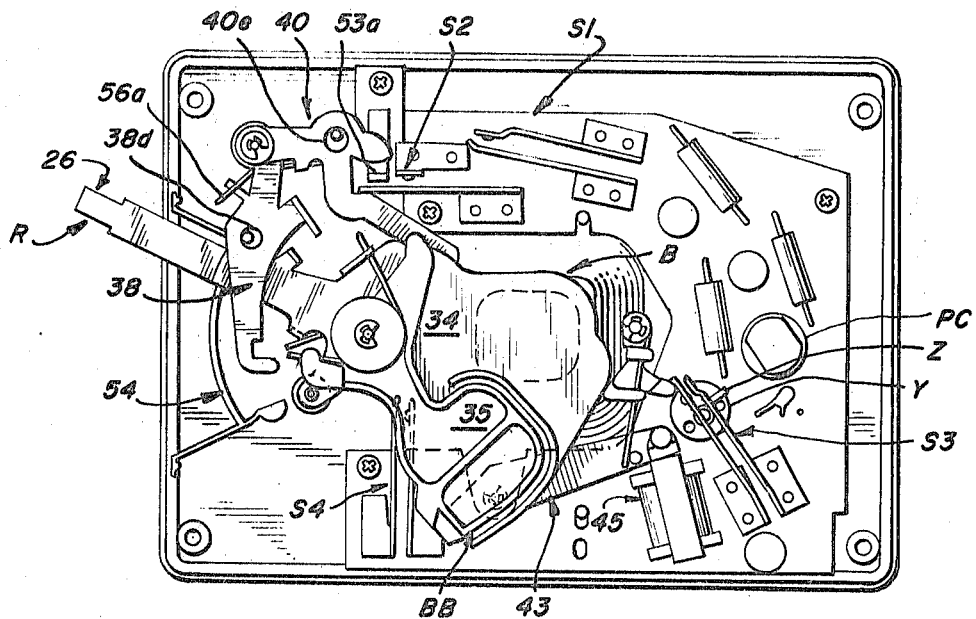
FIG. 2 is an enlarged fragmentary front elevational view of one form of the improved shutter assembly and showing the cocking lever in its rest or inoperative position and the shutter members in their second positions of adjustment.

The cocking lever 26, previously referred to, is mounted for pivotal movement about post 31b as an axis. A coiled spring 41 encompasses the post 31b and exerts a biasing force on the cocking lever 26 urging the latter to assume its rest position R, as seen in FIG. 2.

Figure 4:
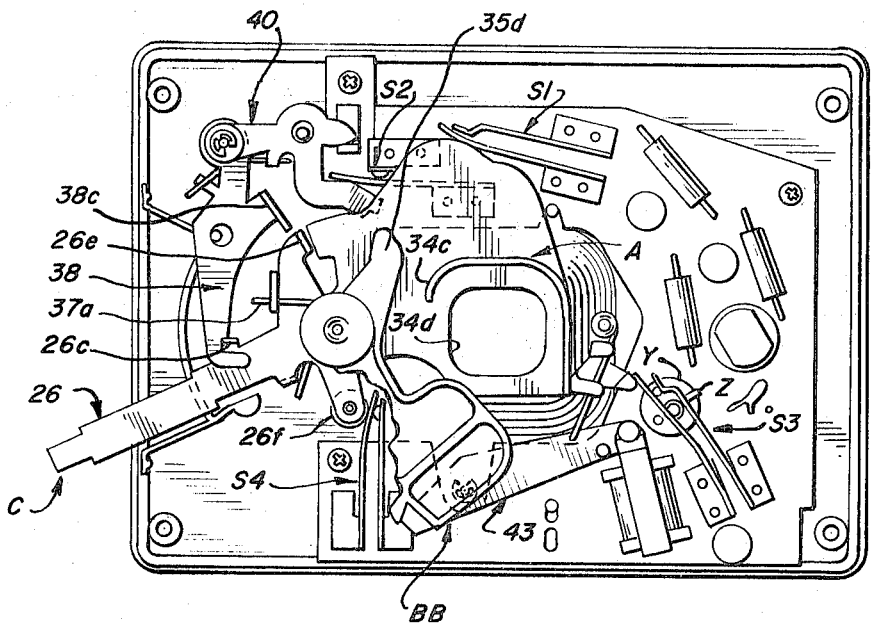
FIG. 4 is similar to FIG. 3 but showing the second latch means in its manually released position, the first shutter member in its first or shutter-open position of adjustment, and the second shutter member retained in its second position of adjustment by the third latch means.

A trigger mechanism 42 is mounted on panel 31 and, when actuated by the depressed trigger button 27, causes the second latch member 40 to pivot about post 31c to release the first shutter member 34 so that it can move to its first position of adjustment A relative to the panel opening 32, see FIG. 4. The sequence of operation of the shutter members, latch members, cocking lever, and trigger mechanism will be described in greater detail hereinafter.

Figure 3:
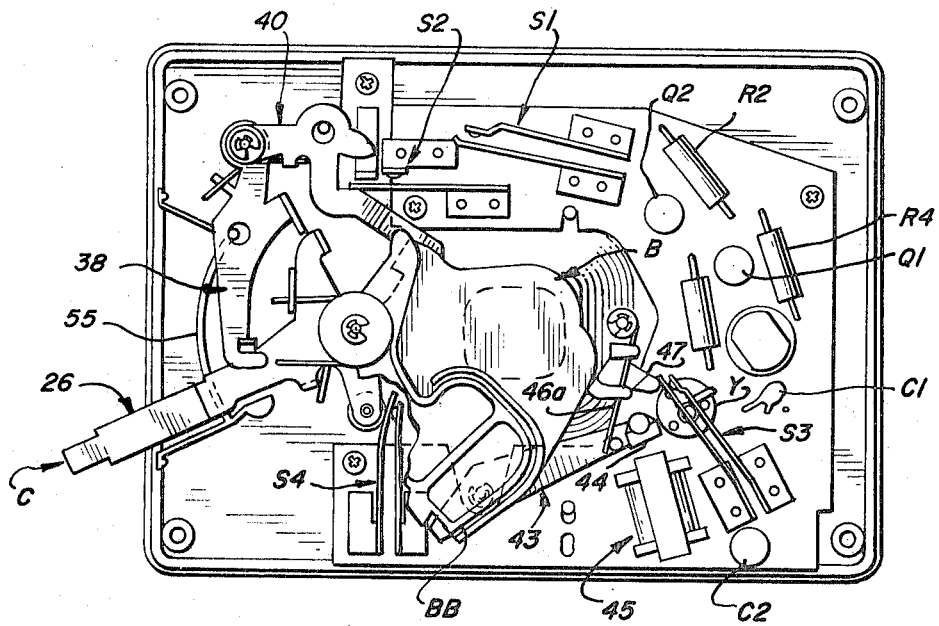
FIG. 3 is similar to FIG. 2 but showing the cocking lever in its cocked or operative position while the shutter members remain static in their second positions of adjustment; a portion of the shutter members being removed to expose an electrical switch.

A third latch member 43 is mounted for pivotal movement about a third post 31d formed on the panel front surface and beneath the panel opening 32. One end of member 43 is provided with a nub 43a which, when shutter member 35 is in its second position of adjustment BB, see FIGS. 2–4, is adapted to be positioned in a notch 35a formed on the periphery of shutter member 35. The opposite end of latch member 43 carries a self-adjusting shoe 44 which is formed of a ferrous or other magnetic material. Mounted on the front surface of the panel 31 and adjacent the shoe 44 is an electromagnet 45 which, when energized, will attract the shoe 44 and cause the latch member 43 to remain in such a position that the nub 43a will be disposed within notch 35a and thus block movement of the second shutter member from its second position of adjustment BB to its first position of adjustment AA, see FIG. 5.

A light biasing spring 46 is mounted on a fourth post 31e formed on the front surface of panel 31 and biases a follower piece 47 into engagement with a cam-shaped peripheral portion 34a of the first shutter member 34. The follower piece 47 is adapted to pivot about post 31e as an axis. When member 34 is in its second position of adjustment B, the distal end 46a of spring 46 engages a second nub 43b located on the end of the latch member 43 carrying the shoe 44. When the nub 43b is engaged by the spring end 46a, the shoe 44 is urged into engagement with the electromagnet 45 notwithstanding that the latter is not energized. Thus, the spring end 46a in such a case serves as a safety preventing accidental or premature disengagement of the nub 43a from the notch 35a.

Figure 10:
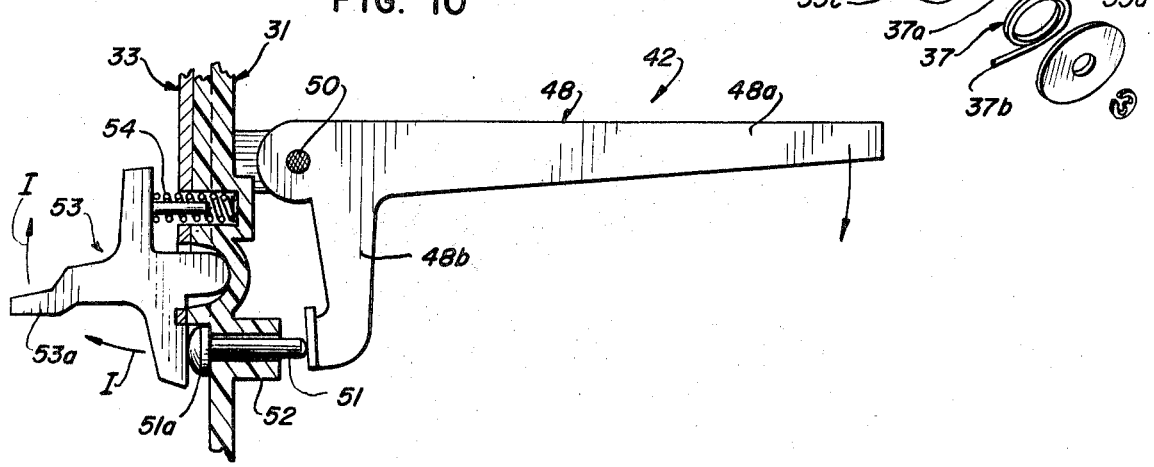
FIG. 10 is an enlarged fragmentary side view in partial section of the trigger mechanism for actuating the second latch means to its shutter member-release position.

The trigger mechnaism 42, previously mentioned, includes a bell-crank lever 48 which is pivotally connected at 50 to the rear surface of panel 31, see FIG. 10. The lever 48 has a rearwardly extending arm 48a which terminates beneath the trigger button 27. In addition, lever 48 has a downwardly extending arm 48a which contacts one end of a pusher pin 51, the latter being slideably disposed within a sleeve 52 formed in the panel 31. The opposite end 51a of pusher pin 51 engages a lifter piece 53 which is adapted to pivot about a floating axis. The lifter piece 53 is biased by a spring 54 to remain in continuous engagement with the end 51a of the pusher pin 51. Lifter piece 53 is provide with a lug 53a which is adapted to subtend a finger 40a formed on the second latch member 40. The lug 53a, when the arm 48a is depressed by the manually actuated trigger button 27, is caused to move upwardly and engage the finger 40a and thereby move the second latch member 40 to its first shutter member-release position SR, see FIGS. 5 and 6.

Cocking lever 26 as seen in FIG. 9 has an elongated arm 26a which extends through a slot 21a formed in the side of the camera-housing 21, see FIG. 1. At approximately mid-length of the arm 26a, there is provided a step 26b. The offset distal portion of the arm 26a caused by the step 26b is in registration with a curved light shield 55 which is formed on the front surface of panel 31. The light shield 55 is located adjacent to, but inwardly of the slot 21a formed in the housing and, thus, prevents light leakage into the interior of the housing.

Besides the step 26b, the arm 26a of the cocking lever 26 is provided with a laterally extending tongue 26c which is adapted to be engaged within a slot 38a formed in the first latch member 38 when the cocking lever 26 is in its cocked position C, see FIG. 3. When tongue 26c is disposed within the slot 38a, the cocking lever is retained in its cocked position until the latch member 38 is subsequently moved to its release position RR, shown in phantom lines in FIG. 5, in a manner to be hereinafter described.

A second tongue 26d is also formed on lever 26 and is adapted to engage legs 36a and 37a of the respective biasing springs 36 and 37 for the shutter members. These latter springs impose a bias on shutter members causing them to be urged in a direction towards positions A or AA.

When lever 26 is manually moved from its rest position R to its cocked position C, the biasing effect of springs 36 and 37 will be enhanced or increased by reason of the tongue 26d being in engagement with the spring legs 36a and 37a and moving the same closer to the other respective spring legs 36b and 37b. Spring leg 36b engages a nub 34e formed on shutter member 34 and spring leg 37b engages a nub 35c formed on shutter member 35, see FIG. 9.

Figure 5:
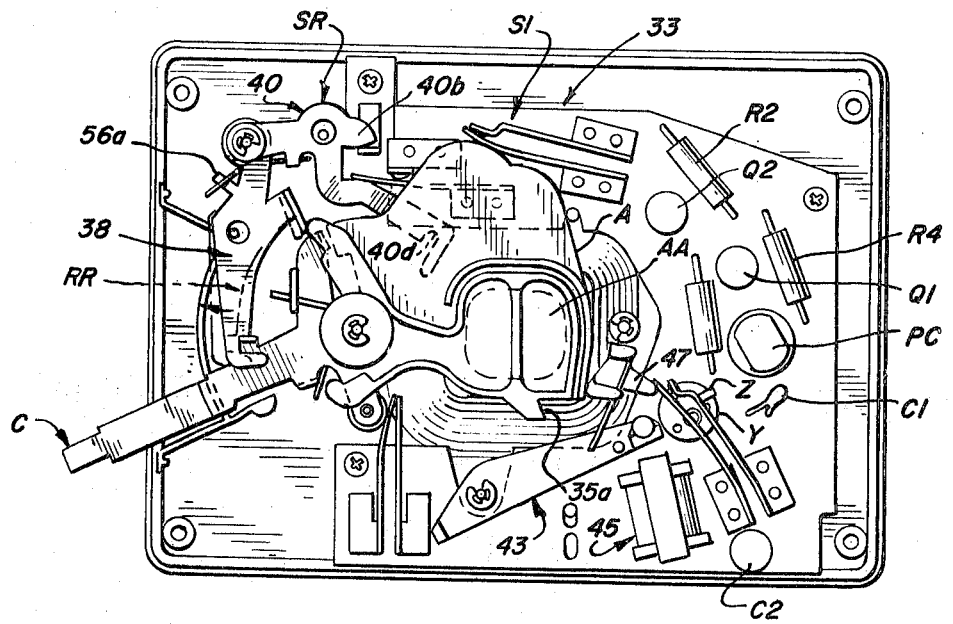
FIG. 5 is similar to FIG. 4 but showing the third latch means in its release position, and the second shutter member in its first position and striking a portion of the first latch means whereby the latter is about to be moved to its cocking lever-release position, shown in phantom lines.
Figure 6:
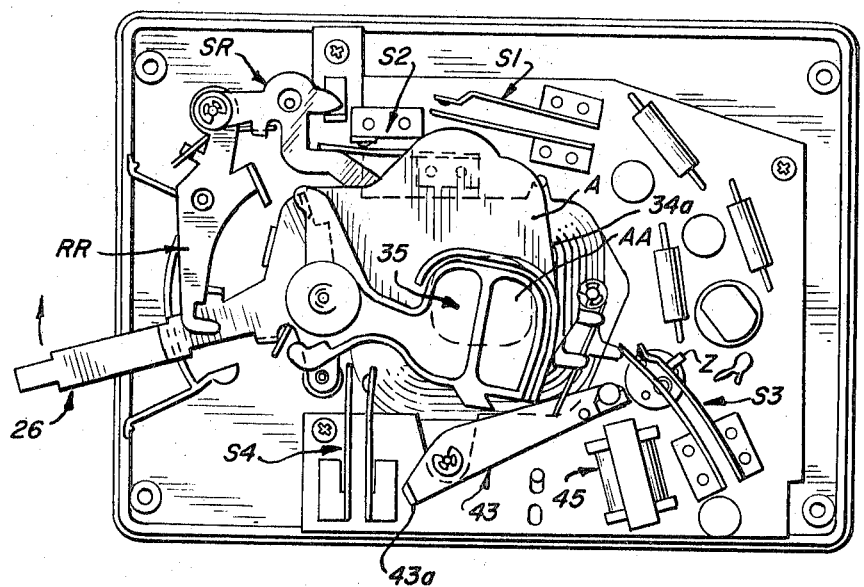
FIG. 6 is similar to FIG. 5 but showing the first latch means in its release position and the cocking lever automatically returning to its rest position and the shutter members simultaneously moving as a unit to their second positions of adjustment.
Figure 7:
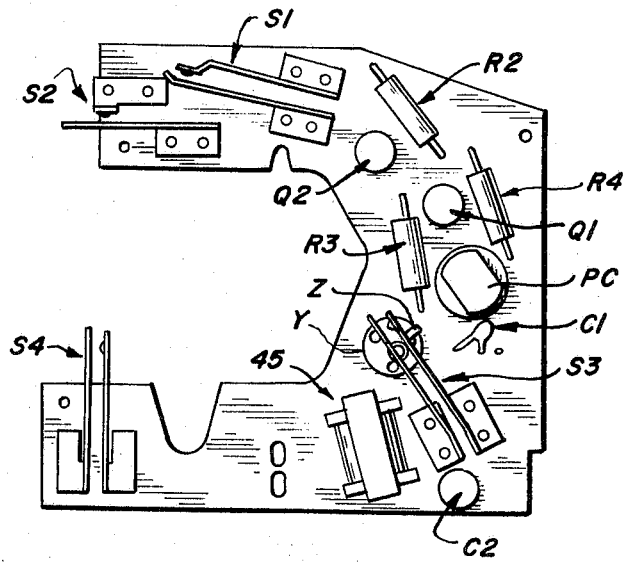
FIG. 7 is an elevational view of the electrical circuit board which is carried on the mounting panel of the shutter assembly.

A third tongue 26e is formed on lever 26, see FIG. 9, which is adapted to engage a shoulder 34b formed on member 34, when the latter is in position A and when the cocking lever 26 is moving from position C to its rest position R, see FIG. 5. Thus, the movement of the cocking lever 26 from position C to position R is transmitted to shutter member 34 through tongue 26e and shoulder 34b and, thus, causes member 34 to move from position A to position B. A flange 34c is formed on the rear face of member 34 which partially delimits the aperture 34d formed in the member 34. The aperture is aligned with the focal axis of the lens 22 when the shutter member 34 is in position A. When this occurs, and when shutter member 35 is in position BB, light rays for a predetermined time interval pass through lens 22, panel opening 32, and member aperture 34d and against the photosensitive surface of the film contained within the camera housing.

The flange 34c is shaped so as to partially conform to the configuration of the peripheral position 35b of member 35, see FIG. 9. Thus, when shutter members 34 and 35 are both disposed in positions A and AA, respectively, see FIG. 5, and shutter member 34 starts to move in a clockwise direction, tongue 26e strikes shoulder 34b and moves shutter member 34 in a clockwise direction causing flange 34c to engage peripheral portion 35b whereupon shutter member 35 simultaneously moves in a clockwise direction from position AA to position BB. Flange 34c coacts with peripheral portion 35b to function as a light shield.

Cocking lever 26 is also provided with a laterally extending roller 26f, the function of which will become apparent when the time delay circuit is hereinafter described.

A fourth laterally extending tongue 26g is formed on cocking lever 26 and is adapted to engage a leg 41a of biasing spring 41. Spring 41 serves to impart a force on lever 26 urging the latter to seek its rest position R. As aforementioned, spring 41 dominates biasing springs 36 and 37.

The first latch member 38, in addition to the slot 38a previously described, is also provided with a lug 38b which is adapted to engage one leg 56a of a coiled biasing spring 56, see FIG. 9. Spring 56 is mounted on post 31c formed on the front surface of panel 31 and leg 56a urges latch member 38 in a counterclockwise direction about post 31c as an axis, causing slot 38a to automatically accommodate lever tongue 26c when the cocking lever 26 reaches its cocked position C.

Latch member 38 is further provided with a transversely extending lug 38c, see FIG. 9, which is adapted to be struck by a fingerlike projection 35d formed on the shutter member 35, when the latter has about reached the end of its movement from position BB to position AA. After projection 35d has made initial contact with lug 38c, further movement of the member 35 to its position AA will cause latch member 38 to pivot in a clockwise direction a sufficient amount so that the tongue 26c of the cocking lever 26 will become disengaged from slot 38a.

An opening 38d is formed in latch member 38 and is adapted to receive a stationary pin 49 carried by panel 31, see FIG. 9. The opening 38d is oversized relative to the pin and, thus, the pin limits the extent that latch member 38 can pivot when the lug 38c is engaged by projection 35d.

Second latch member 40 is adapted to pivot about post 31c as an axis, and is biased in a clockwise direction by a second leg 56b of spring 56 engaging a lug 40a formed on latch member 40, see FIG. 9. Latch member 40 is also provided with a first finger 40b which is adapted to be engaged by lug 53a of lifter 53 when the latter is rotated in the direction of the arrows I in FIG. 10 by the pusher pin 51.

A second finger 40c is formed on latch member 40 and the outer end of the finger is notched at 40d. The notch 40d is adapted to automatically interlock with the shoulder 34b of shutter member 34, when the latter is in position B. Thus, while lever 26 is being moved to its cocked position C, notch 40d is in interlocking relation with shoulder 34b causing the shutter member 34 to remain in a static condition. To unlock the shoulder from the notch requires latch member 40 to be pivoted a sufficient amount in a counterclockwise direction by lifter piece 53 to disengage the shoulder from the notch. To limit the extent to which latch member 40 can be moved to the release position SR, an oversize hole 40e is formed in the latch member for accommodating a second stationary pin 57 carried on the front surface of panel 31.

The time delay control circuit, which is shown diagrammatically in FIG. 8, controls the time interval after shutter member 34 has reached its position A, wherein aperture 34d is aligned with panel opening 32, and when shutter member 35 has reached its position AA.

When member 35 is in position AA, the aperture 34d is closed and, thus, the exposure of the film to the light rays is abruptly terminated. The time interval in question may vary, for example, from approximately one twenty-fifth of a second to approximately 1/1000 of a second. When the strobe light switch 24 is in the "off" position, the time interval will be determined by the intensity of the light passing through the auxiliary opening 23 provided at the front end of the housing 21, see FIG. 1.

The control circuit, see FIG. 8, includes the following basic components: a photo-responsive cell PC which is responsive to the light intensity passing through auxiliary opening 23; a timing capacitor C1; resistors R2, R3 and R4; mechanically actuated switches S1, S2 and S3; a strobe light interlock switch S4; a filtering capacitor C2; a detector circuit II including transistors $Q_1$ and $Q_2$; and the electromagnet 45.

When the camera shutter assembly is in a non-operating condition, such as shown in FIG. 2, the discharge switch S3 is held in a closed condition by the follower 47, which in turn, is held in switch closing position by the cam peripheral surface portion 34a of shutter member 34. When switch S3 is closed, the timing capacitor C1 is shorted. The remaining switches S1, S2, and S4, all remain open when the assembly is in the condition shown in FIG. 2. Upon lever 26 being manually moved to its cocked position C, FIG. 3, the roller 26f, carried by lever 26 causes switch S4 to close, while switch S3 remains closed and switches S1 and S2 remain open. Switch S2 is held open by the lifter piece 53. Closing switch S4 is important only if the switch 24 on the front of the housing 21 is to be manually adjusted to an "on" position, as shown in phantom lines in FIG. 1. Thus, switch 24, when in its "on" position, cannot be effective unless the cocking lever 26 is in its cocked position C. Because of the interlocking relation between switches S4 and 24, the battery cannot be unnecessarily drained in the event switch 24 is left in its "on" position.

Upon the trigger button 27 being depressed while the lever 26 is in its cocked position C, switch S2 is disengaged from the lifter piece 53 and, thus, closes automatically, see FIG. 4, and remains closed, so long as the trigger button 27 is held in a depressed condition. When S2 is closed, switch S3 opens because of the movement of shutter member 34 from position B to position A which in turn allows the follower 47 to move away relieving the closing force applied to switch S3. Upon shutter member 34 reaching position A, switch S1 is closed by the periphery of member 34. Opening of switch S3 allows battery voltage to build up across the timing capacitor C1. In order to permit proper control of the opening and closing of switch S3 by the follower 47, an eccentrically mounted cam piece Y is mounted on the panel surface. The periphery of the piece Y is in sliding contact with a finger Z found on one of the switch contacts. Closing of switch S2 applies battery voltage to the photo-responsive cell PC which is in series with capacitor C1 and causes capacitor C1 to start charging towards the battery voltage. When capacitor C1 charges to the threshold voltage of the detector circuit II, the electromagnet 45 becomes deenergized, causing the latch member 43 to be disengaged from notch 35a allowing shutter member 35 to move to position AA closing aperture 34d of member 34.

More specifically, closure of switch S2 at the beginning of the timed interval, causes the transistor $Q_2$ of circuit II to conduct as a result of the bias current applied thereto through the resistor R2. When this occurs, the electromagnet 45 is immediately energized. The current flowing through electromagnet 45 and the transistor $Q_2$ causes a voltage to be developed across resistor R3 which sets the threshold voltage for capacitor C1. As capacitor C1 charges beyond the voltage across resistor R3, detector transistor $Q_1$ starts to conduct. The resistor R4 limits the turn-on rate of detector circuit II and the discharge time of capacitor C1. As transistor $Q_1$ turns on, its collector voltage falls toward its base voltage (the threshold voltage across resistor R3). The bias current is diverted from the base of transistor $Q_2$ through transistor $Q_1$ and transistor $Q_2$ turns off, causing the electromagnet 45 to deenergize and shutter member 35 to move to position AA. Switch S3 is closed when the shutter assembly is inoperative, FIG. 2, and prevents a charge from building up on the capacitor C1.

As indicated above, movement of the shutter member 34 to position A causes switch S1 to close. If the strobe switch 24 has been closed, the associated strobe or "flash" unit is operative and the timing circuit operation is altered. The strobe trigger signal shown in FIG. 8 initiates the flash (by means not shown) and simultaneously results in the battery positive voltage being connected to the capacitor C1 through the closed switches S1 and 24. The photo-responsive cell PC is rendered ineffective, and the capacitor charges instantaneously to beyond the threshold voltage of the circuit II. The transistors $Q_1$ and $Q_2$ are rendered conductive and nonconductive, respectively, causing the electromagnet 45 to become deenergized. This electrical switching action occurs in a negligible time interval. The "shutter-open" period is determined primarily by the mechanical delay in the shutter member linkage.

From the foregoing, it is seen that the circuit provides a shutter time delay of a variable duration corresponding to the ambient light characteristics when the strobe circuit is not being utilized (switch 24 open). Alternatively, a shutter time delay of a fixed duration corresponding to the nominal flash intensity results when the strobe circuit is used (switch 24 closed).

Thus, it will be seen that a shuter assembly has bee provided which utilizes both simple mechanical and electrical components. Furthermore, the shutter assembly is versatile to accommodate a variety of light intensity conditions which may be encountered when using a camera embodying the assembly. The shutter assembly is compact and may be readily serviced when required.

I claim:

1. A camera shutter assembly comprising a mounting panel having an opening formed therein and aligned with the focal axis of the camera lens; an apertured first shutter member adjustably mounted on said panel and, when in a first position of adjustment, having an aperture thereof aligned with said panel opening, and when in a second position of adjustment, having said aperture in non-registered relation with said panel opening whereby said opening is closed by said first shutter member, said first shutter member being biased to assume said first position of adjustment; a second shutter member adjustably mounted on said panel and movable to a first position of adjustment independently of but subsequent to said first shutter member having reached its first position of adjustment whereby said first shutter member aperture is closed by said second shutter member, said second shutter member being biased to assume said first position of adjustment, said second shutter member being adapted to assume a second position of adjustment out of registration with said panel opening, said first and second shutter members being movable as a unit from their first positions of adjustment to their second positions of adjustment; a cocking lever pivotally mounted on said panel and manually movable from a rest position to a cocked position independently of said shutter members, said lever being biased to assume said rest position; a first latch member adjustably mounted on said panel and adapted to automatically retain said lever in said cocked position and movable to a lever-release position by said second shutter member upon the latter assuming its first position of adjustment; a second latch member adjustably mounted on said panel and biased to assume a position whereby said shutter members are retained in said second positions of adjustment during movement of said lever to and while disposed in said cocked position, said second latch member subsequent to said lever assuming its cocked position, being manually adjusted to a release position whereby said first shutter member automatically moves to its first position of adjustment; a third latch member adjustably mounted on said panel to assume an interlock position with said second shutter member when the latter is in its second position of adjustment; and time delay means operatively connected to said third latch member for controlling movement of the latter to an unlock position after finite time interval has elapsed subsequent to said first shutter member assuming its first position of adjustment.

2. The camera shutter assembly of claim 1 wherein movement of said cocking lever to its cocked position increases the biasing effect exerted on said shutter members while the latter are retained in their second positions of adjustment.

3. The camera shutter assembly of claim 1 wherein said shutter members are mounted for pivotal movement about a first common axis.

4. The camera shutter assembly of claim 3 wherein the first and second latch members are mounted for pivotal movement about a second common axis.

5. The camera shutter assembly of claim 1 wherein said first shutter member is automatically movable from its first to its second positions of adjustment only if the cocking lever has been moved to said cocked position prior to said second latch member being manually adjusted to said release position.

6. The camera shutter assembly of claim 1 wherein said time delay means includes a control circuit comprising a source of electrical power; a strobe light circuit selectively energized from said power sources; an actuator for providing an exposure initiating signal; a manual switching device having first and second positions for selectively enabling of disabling energization of said strobe light circuit; means responsive to said exposure initiating signal for placing a shutter operating mechanism in its first operative state and simultaneously energizing said strobe light circuit provided said switching device is in said first position; means for establishing a timed interval of either a variable duration corresponding to the ambient light characteristics or of a fixed duration corresponding to the nominal strobe light intensity, depending upon whether said manual switching device is in said second or first position, respectively; and means responsive to said first shutter member upon the latter being moved from its second to its first positions of adjustment for initiating said timed interval.

7. The camera shutter assembly of claim 6 wherein the components comprising said time delay means are mounted on a single panel.

* * * * *

UNITED STATES PATENT OFFICE
CERTIFICATE OF CORRECTION

Patent No. 3,762,289　　　　　　　Dated　October 2, 1973

Inventor(s)　ISRAEL NESSON

It is certified that error appears in the above-identified patent and that said Letters Patent are hereby corrected as shown below:

Column 2, line 17, "menas" should be -- means --

Column 4, line 52, "mechnaism" should be -- mechanism --

Column 4, line 64, "provide" should be -- provided --

Column 6, line 44, after the word "lifter" insert -- piece --

Column 8, line 46, "bee" should be -- been --

Column 10, line 21, "of" should be -- or --

Signed and sealed this 29th day of January 1974.

(SEAL)
Attest:

EDWARD M. FLETCHER, JR.
Attesting Officer

RENE D. TEGTMEYER
Acting Commissioner of Patents